US012297806B2

(12) United States Patent
Pinto Frutuoso et al.

(10) Patent No.: US 12,297,806 B2
(45) Date of Patent: May 13, 2025

(54) METHOD OF CALIBRATING A REFERENCE OF A WIND TURBINE

(71) Applicant: VESTAS WIND SYSTEMS A/S, Aarhus N (DK)

(72) Inventors: Ines Pinto Frutuoso, Viana do Castelo (PT); Goncalo Lucas Marcos, Malmö (SE); Goncalo Artur Duarte Pereira, Leça do Balio (PT); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/681,767

(22) PCT Filed: Aug. 4, 2022

(86) PCT No.: PCT/DK2022/050163
§ 371 (c)(1),
(2) Date: Feb. 6, 2024

(87) PCT Pub. No.: WO2023/011696
PCT Pub. Date: Feb. 9, 2023

(65) Prior Publication Data
US 2024/0376865 A1 Nov. 14, 2024

(30) Foreign Application Priority Data
Aug. 6, 2021 (DK) .............................. PA202170399

(51) Int. Cl.
*F03D 17/00* (2016.01)
(52) U.S. Cl.
CPC ........ *F03D 17/025* (2023.08); *F05B 2260/83* (2013.01); *F05B 2270/303* (2013.01)
(58) Field of Classification Search
CPC ..... F03D 17/025; F03D 17/00; F05B 2260/83
(Continued)

(56) References Cited

U.S. PATENT DOCUMENTS 7,487,673 B2 * 2/2009 Ormel .................... F03D 80/40
416/41
7,823,437 B2 * 11/2010 Siebers .................... G01P 5/07
73/1.37
(Continued)

FOREIGN PATENT DOCUMENTS

CN 107795440 A 3/2018
EP 1936184 A2 6/2008
(Continued)

OTHER PUBLICATIONS

PCT, International Search Report and Written Opinion of The International Searching Authority for Application PCT/DK2022/050163 dated Oct. 31, 2022 (Oct. 31, 2022).
(Continued)

*Primary Examiner* — Michael L Sehn
(74) *Attorney, Agent, or Firm* — Patterson + Sheridan, LLP

(57) ABSTRACT

A method of calibrating a reference of a wind turbine. The method comprises monitoring performance of the wind turbine over a calibration period to generate performance data, wherein the calibration period comprises a series of sub-periods. The reference is calibrated by: setting the reference on the basis of the performance data; and, for each sub-period: determining a sub-period value on the basis of the performance data generated during that sub-period, comparing the sub-period value with the reference, and updating the reference with the sub-period value if the comparison shows that a performance of the wind turbine indicated by the sub-period value is better than a performance of the wind turbine indicated by the reference. The comparison and updating steps enable the reference to more accurately reflect more recent performance of the wind
(Continued)

turbine. The method can also be reliably used in freezing temperatures.

14 Claims, 6 Drawing Sheets

(58) Field of Classification Search
USPC .......................................................... 416/61
See application file for complete search history.

(56) References Cited

U.S. PATENT DOCUMENTS

| 2018/0335019 | A1 | 11/2018 | Knudsen et al. |
| 2020/0088171 | A1 | 3/2020 | Goldner et al. |

FOREIGN PATENT DOCUMENTS

| EP | 2112375 | A2 | 10/2009 |
| WO | 2020083451 | A1 | 4/2020 |
| WO | 2020125895 | A1 | 6/2020 |
| WO | 2020216424 | A1 | 10/2020 |

OTHER PUBLICATIONS

Danish Patent and Trademark Office, 1st Technical Examination for Application PA 2021 70399 dated Feb. 14, 2022.

\* cited by examiner

METHOD OF CALIBRATING A REFERENCE OF A WIND TURBINE

FIELD OF THE INVENTION

The present invention relates to a method, and an associated apparatus and computer program product, for calibrating a reference of a wind turbine. The reference may be used to detect a state of the wind turbine, such as an icing state.

BACKGROUND OF THE INVENTION

WO2020216424A1 discloses a controller and method for an ice detection system of a wind turbine for determining whether to halt operation of the wind turbine. The controller determines an expected output power and an actual output power of the wind turbine. The controller determines a power difference between the expected output power and the actual output power. The controller disables the wind turbine when it is determined that operation of the wind turbine is to be halted, which is to be determined based on whether the power difference is greater than a threshold power difference value.

The determination is made with reference to a reference power curve of the wind turbine. Specifically, sensor output data from wind speed sensors is used to determine an expected power to be generated by the wind turbine. That is, with reference to the power curve of the wind turbine the power that may be expected to be generated by the wind turbine in normal operating conditions, i.e. no ice present, for the measured wind speed is determined.

The reference power curve of the wind turbine is based on the output power of the turbine for a given wind speed and may be built up over several months, e.g. three to six months, during which the turbine operates normally, i.e. when there is no ice such as during summer months.

SUMMARY OF THE INVENTION

A first aspect of the invention provides a method of calibrating a reference of a wind turbine, the method comprising: monitoring performance of the wind turbine over a calibration period to generate performance data, wherein the calibration period comprises a series of sub-periods; and for each sub-period: determining an operational condition of the wind turbine, and determine if the operational condition is a pre-defined operational condition, for an operational condition being a pre-defined operational condition: determining a sub-period value on the basis of the performance data generated during that sub-period and updating the reference with the sub-period value thereby calibrating the reference, and for all operational conditions: determining a sub-period value on the basis of the performance data generated during that sub-period, comparing the sub-period value with the reference, and updating the reference with the sub-period value if the comparison shows that a performance of the wind turbine indicated by the sub-period value is better than a performance of the wind turbine indicated by the reference thereby calibrating the reference.

Optionally the pre-defined operational condition is a condition associated with temperature readings above a freezing threshold, and at least one of the sub-period values is determined on the basis of performance data associated with temperature readings below the freezing threshold.

Optionally the method further comprises terminating the calibration period when an amount of the performance data associated with temperature readings above the freezing threshold reaches a calibration threshold.

Optionally the reference is set on the basis of performance data for a plurality of the sub-periods.

Optionally the performance data is divided between a plurality of bins; each bin is associated with a respective selected operating condition of the wind turbine; and the method is performed per bin to calibrate a reference per bin.

Optionally each bin is associated with a respective range of wind speeds.

Optionally the reference is set on the basis of a running average of the performance data.

Optionally the running average is determined on the basis of a sample count; and the method further comprises resetting the sample count if the comparison shows that the performance of the wind turbine indicated by the sub-period value is better than the performance of the wind turbine indicated by the reference.

Optionally the sub-period value is a sub-period average indicative of an average of the performance data generated during that sub-period.

Optionally the wind turbine is subject to an ambient temperature below 0° C. for at least some of the calibration period.

Optionally the performance data is indicative of a power generated by the wind turbine.

Optionally the method further comprises, at the start of the calibration period, setting the reference to a degraded value.

Optionally each sub-period has a duration of a week or longer.

Optionally each sub-period has the same duration.

A second aspect of the invention provides a method of detecting a state of a wind turbine, the method comprising: calibrating a reference of the wind turbine by the method of the first aspect; and, during the calibration period, detecting a state of the wind turbine by comparing the performance data with the reference.

Optionally the state is an icing state.

A further aspect of the invention provides a method of operating a wind turbine, the method comprising: detecting a state of the wind turbine by the method of the second aspect; and operating the wind turbine on the basis of the detected state.

Optionally the wind turbine is operated on the basis of the detected state by changing an operating parameter of the wind turbine, or by actuating an ice removal system of the wind turbine.

A further aspect of the invention provides apparatus configured to perform the method of the first aspect, the apparatus comprising: a performance sensor configured to monitor the performance of the wind turbine to generate the performance data; and a calibration system configured to calibrate the reference.

A further aspect of the invention provides a computer program product comprising software code adapted to calibrate a reference of a wind turbine when executed on a data processing system, the computer program product being adapted to perform the method of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
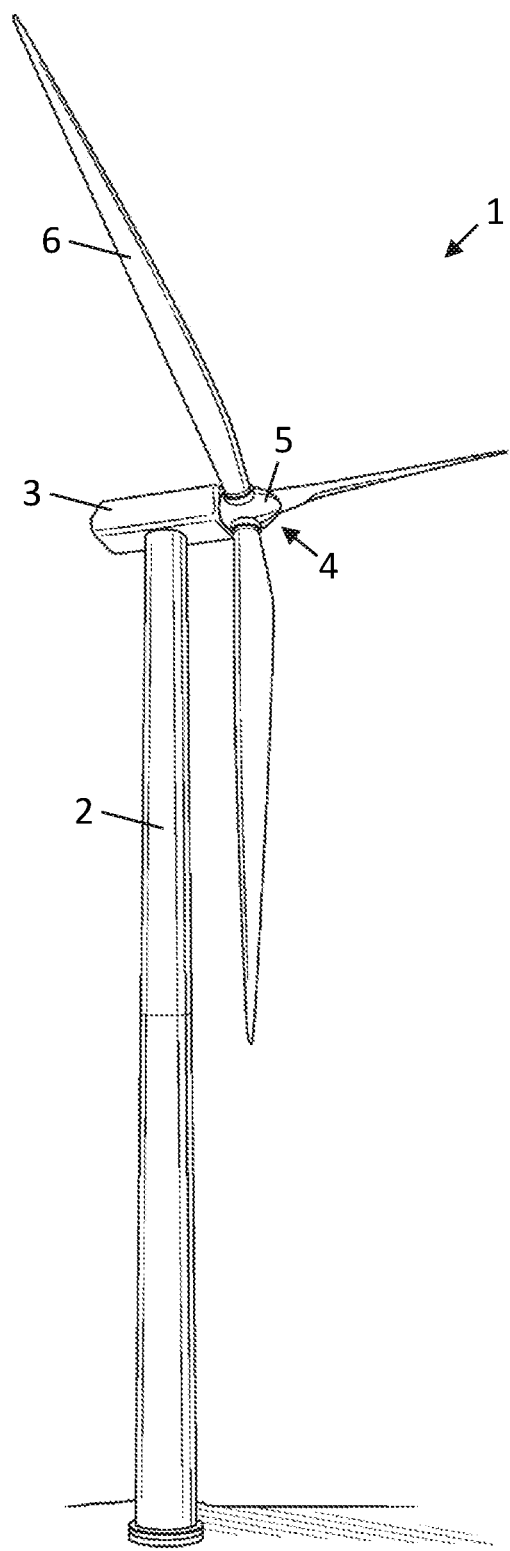
FIG. 1 shows a wind turbine.

FIG. 1 illustrates, in a schematic perspective view, a wind turbine 1. The wind turbine 1 includes a tower 2, a nacelle 3 at the top of the tower, and a rotor 4 operatively coupled to a generator housed inside the nacelle 3. In addition to the generator, the nacelle 3 houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary.

Figure 2:
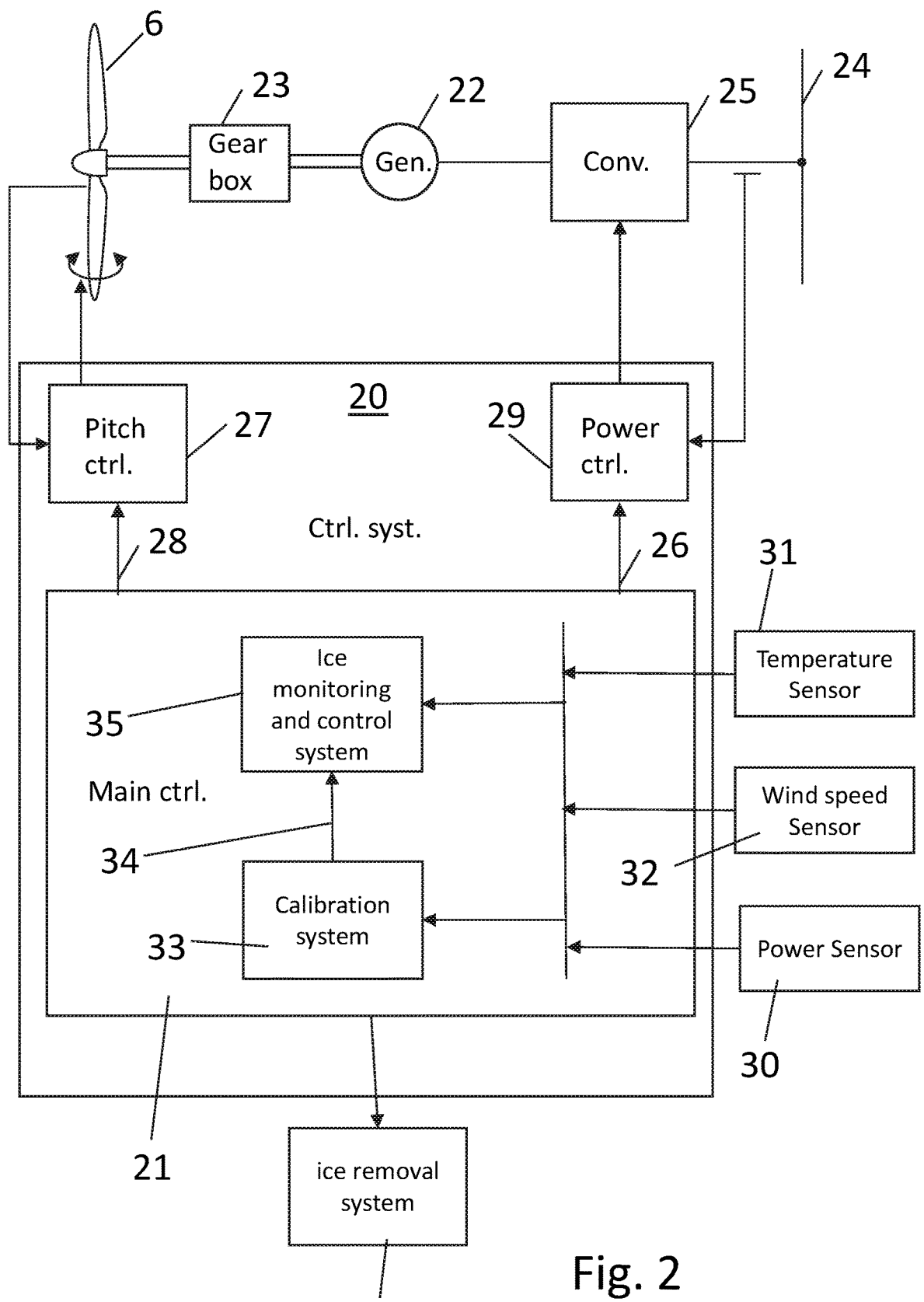
FIG. 2 shows further details of the wind turbine.

FIG. 2 schematically illustrates an embodiment of a wind turbine control system configured to control the wind turbine 1. The control system 20 may be placed inside the nacelle 3 and/or distributed at a number of locations inside the turbine. Optionally some, or all, elements of the control system 20 may be placed in a remote power plant controller (not shown).

The blades 6 are mechanically connected to an electrical generator 22 via a gearbox 23. In direct drive systems, and other systems, the gearbox 23 may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 21. In general, the control system 20 ensures that in operation the wind turbine generates a requested power output level. This is obtained by adjusting the pitch angle of the blades 6 and/or the power extraction of the converter 25. To this end, the control system comprises a pitch system including a pitch controller 27 using a pitch reference 28, and a power system including a power controller 29 using a power reference 26. The rotor blades 6 can be pitched by a pitch mechanism. The rotor comprises an individual pitch system which is capable of individual pitching of the rotor blades 6, and may comprise a common pitch system which adjusts all pitch angles on all rotor blades at the same time.

The main controller 21 comprises a data processing system, and a computer program product comprising software code adapted to control the wind turbine 1 when executed on the data processing system, the computer program product being adapted to control the wind turbine as described below.

The wind turbine comprises a power sensor 30 configured to monitor the performance of the wind turbine to generate performance data; a temperature sensor 31; and a wind speed sensor 32. In the examples below, the power sensor obtains grid power data, indicative of an output power being delivered by the wind turbine to the power grid 24, although other power performance indicators may be used.

The main controller 21 comprises a calibration system 33 configured to calibrate reference data 34 as described below.

The calibration system 33 comprises software code adapted to calibrate the reference data 34 when executed on the data processing system of the main controller 21.

The main controller 21 also comprises an ice monitoring and control system 35, which receives the reference data 34 from the calibration system 33. The ice monitoring and control system 35 is configured to detect an icing state of the wind turbine, and operate the wind turbine on the basis of the detected icing state, by the method shown in FIG. 3.

Figure 3:
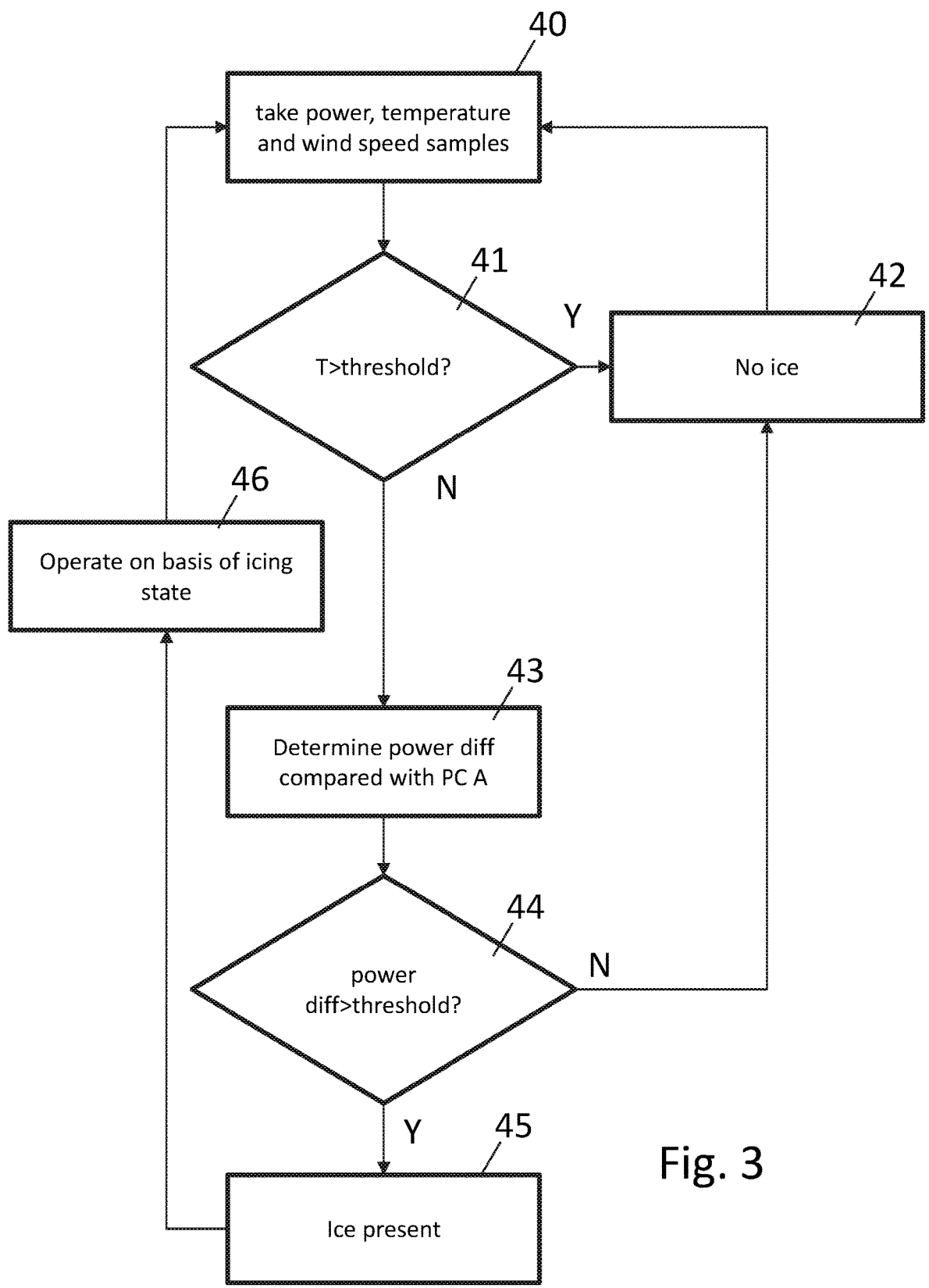
FIG. 3 shows a method of detecting an icing condition and controlling the wind turbine accordingly.

Referring to FIG. 3: in step 40, the ice monitoring and control system 35 takes power, ambient temperature and wind speed readings from the power sensor 30, temperature sensor 31 and wind speed sensor 32 respectively.

At step 41 the temperature reading is compared with a freezing threshold, such as 0° C. If greater, then it is determined at step 42 that there is no ice, and the ice monitoring and control system 35 instructs the main controller 21 to continue to operate the wind turbine on the basis of the detected "no ice" icing state. Otherwise, the icing state of the wind turbine is determined by comparing the power reading with the reference data 34.

Figure 4:
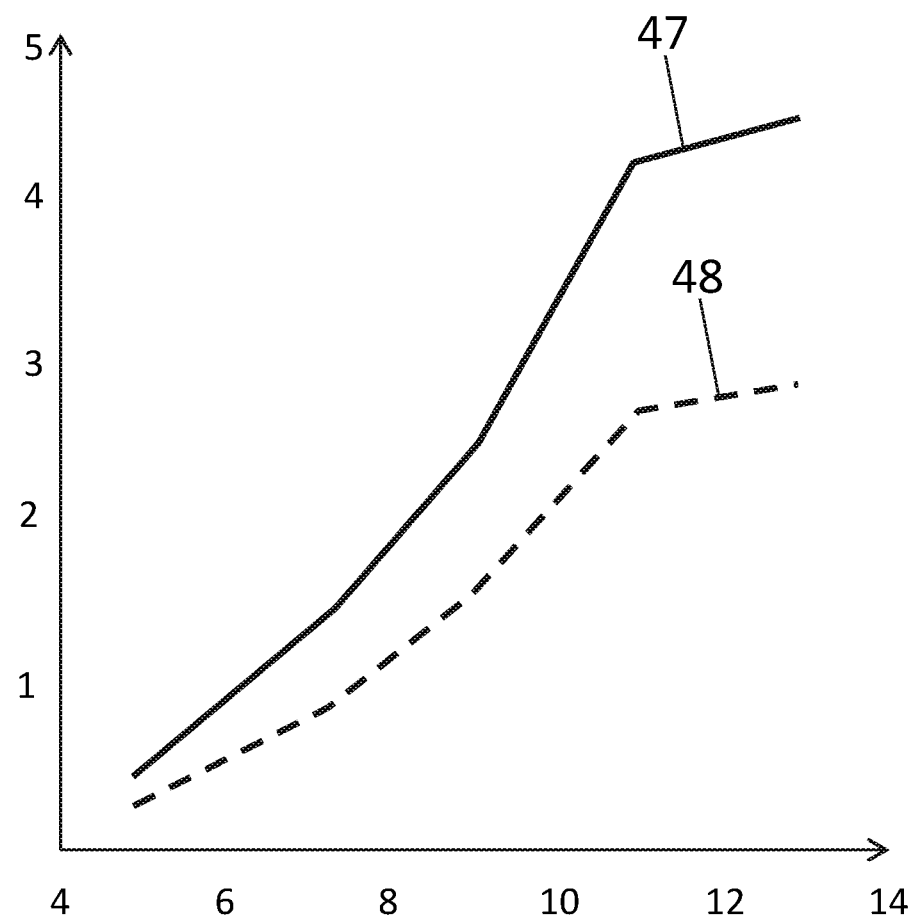
FIG. 4 shows a reference power curve and a degraded power curve.

FIG. 4 gives a simplified example of the reference data 34, with the reference data 34 illustrated as a power curve 47. The reference data 34 is divided between a plurality of bins, and each bin is associated with a respective selected operating condition of the wind turbine. In the current example the selected operating condition is a respective range of wind speeds. In this simplified example there are five bins associated with wind speeds of 4-6 m/s, 6-8 m/s, 8-10 m/s, 10-12 m/s and 12-14 m/s. The 4-6 m/s bin contains a reference grid power of 0.5 MW, the 8-m/s bin contains a reference grid power of 2.5 MW, and so on. Thus if the wind speed is 4-6 m/s, then the grid power is expected to be 0.5 MW; and if the wind speed is 8-10 m/s, then the grid power is expected to be 2.5 MW. Note that this is a very simplified example, and a much larger number of bins would normally be used.

At step 43 of FIG. 3, a power difference is determined— i.e. a difference between the power reading and the expected power as defined by the reference data 34. So in the examples above, if the wind speed is 4-6 m/s then the power difference is calculated as the difference between the power reading and the expected power of 0.5 MW; and if the wind speed is 8-10 m/s then the power difference is calculated as the difference between the power reading and the expected power of 2.5 MW. Alternatively, a power ratio may be determined at step 43.

Note that the comparison at step 43 may be based on instantaneous measurements, or a rolling average relative output power, i.e. a curve of the measured or actual output power versus the reference for a given wind speed.

The power difference is compared with a threshold at step 44. If it is not greater than the threshold, then it is determined at step 42 that there is no ice and the ice monitoring and control system 35 instructs the main controller 21 to continue to operate the wind turbine on the basis of the detected "no ice" icing state. If greater, then it is determined at step 45 that ice is present. At step 46 the ice monitoring and control system 35 instructs the main controller 21 to operate the wind turbine on the basis of the detected "ice present" icing state. For instance the main controller 21 may change an operating parameter of the wind turbine (such as the blade pitch angle) or actuate an ice removal system 36 of the wind turbine (for instance to heat the blades 6). By way of example, the changing of the operating parameter of the wind turbine may shut down the turbine, put the wind turbine into an idling state, or change the power output.

Figure 5:
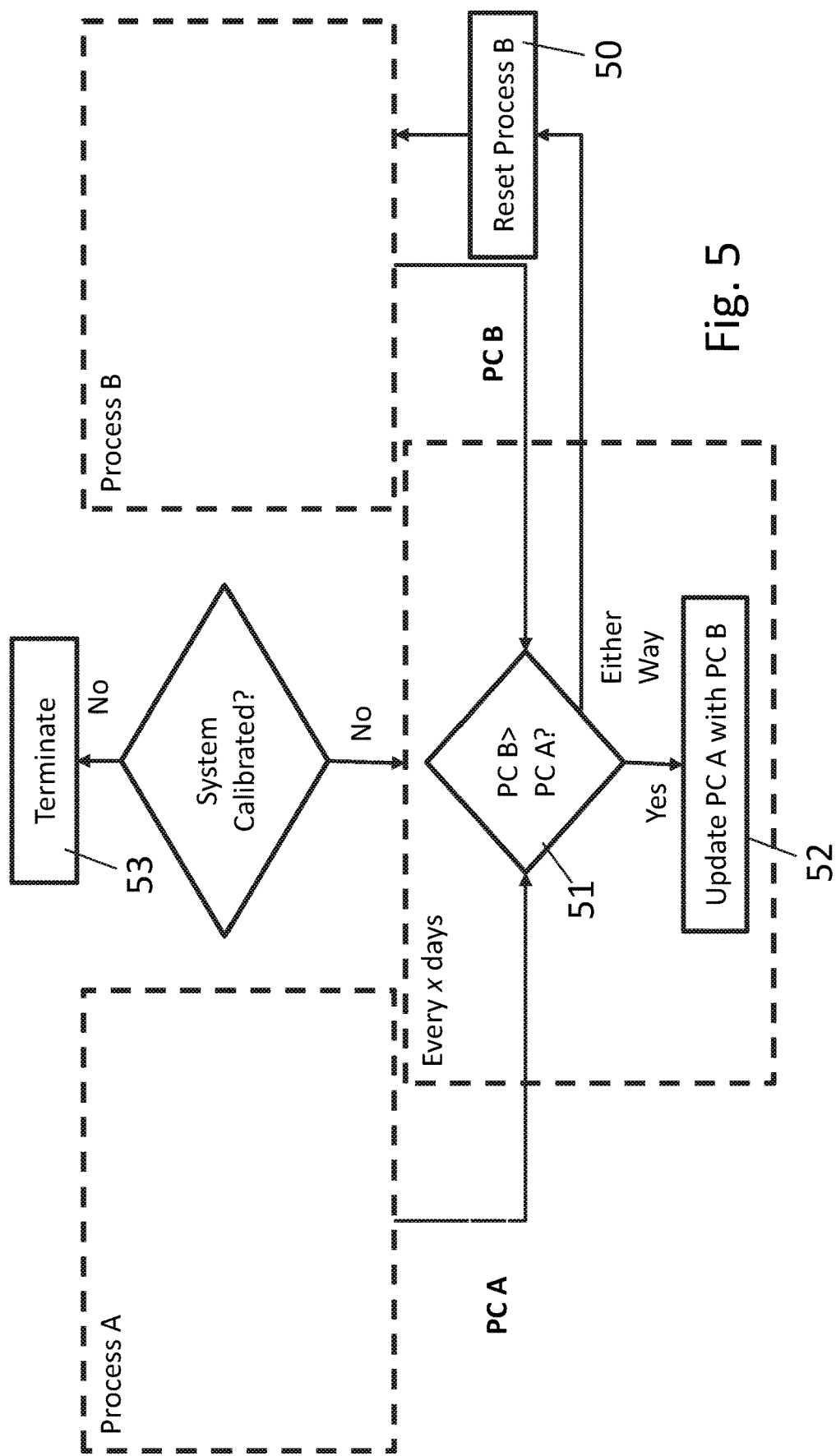
FIG. 5 shows a first method of calibrating a reference.

The calibration system 33 may be configured to calibrate the reference data 34 by the method shown in FIG. 5. In the current example embodiment, the reference data 34 is divided between a plurality of bins. In the embodiment of FIG. 5 the method is performed per bin to calibrate a reference per bin.

The calibration system 33 initially operates over a calibration period. The start of the calibration period may coincide with the start of operating life of the wind turbine. Alternatively the calibration system 33 may be retro-fitted to a wind turbine part way through its operating life.

During the calibration period, the calibration system 33 takes power, ambient temperature and wind speed readings from the power sensor 30, temperature sensor 31 and wind speed sensor 32 respectively. These readings may be taken regularly, for instance once every 0.1 s. So each power reading is associated with a temperature reading and a wind speed reading.

The calibration system 33 simultaneously runs two processes: Process A and Process B. The output of Process A is PC A, and the output of Process B is PC B. Throughout the calibration period, the reference for each bin used in step 43 of FIG. 3 is set to be the same as the current value of PC A.

At the start of the calibration period, PC A may be set to a degraded value indicated in FIG. 4 by a degraded power curve 48. For example the degraded power curve 48 may be 60% or 70% of a standard reference curve. Thus the degraded value is significantly lower than will be expected during normal operation.

Process A keeps a running average of the power readings. The running average is determined on a basis of a cumulative sum of the power readings and a Process A sample count. So after Process A has been running for 1 s, the Process A sample count will be ten, and the running average will the sum of the ten power readings, divided by ten.

Alternatively, the degraded value may be treated as the first sample for Process A. So in the example above, if the degraded value is treated as the first sample for Process A, then after 1 s the Process A sample count will be eleven.

The calibration period comprises a series of sub-periods and for each sub-period an operational condition of the wind turbine is determined and the operational condition is compared to a pre-defined operational condition. In an embodiment, the pre-defined operational condition is a condition associated with temperature readings above a freezing threshold, Process A only runs when the operational condition is the pre-defined operational condition, which in an embodiment is when the ambient temperature, as determined by the temperature sensor 31, is above a freezing threshold, such as 0° C. So if the temperature drops to the freezing threshold or below, then Process A stops, and PC A and the Process A sample count are fixed at their latest values. Also, if the temperature is at or below the freezing threshold at the start of the calibration, then PC A remains fixed at the degraded value until the temperature rises above the freezing threshold, and PC A starts running.

Process B is identical to Process A in many respects, but Process B runs during all operational conditions, e.g. at all temperatures. Process B keeps a running average of the power readings, but over a shorter period than Process A. The running average for Process B is determined on a basis of a cumulative sum of the power readings and a Process B sample count. So after Process B has been running for 1 s, the Process B sample count will be ten, and the running average will the sum of the ten power readings, divided by ten. At the start of the calibration period, the output of Process B (PC B) may be set to the same degraded value as Process A. The degraded value may be treated as the first sample for Process B. So in the example above, if the degraded value is treated as the first sample for Process B, then after 1 s the Process B sample count will be eleven.

Every x days Process B is reset at step 50 of FIG. 5. In the reset step 50, PC B may be reset to zero, along with the cumulative sum for Process B and the Process B sample count. Alternatively, in the reset step 50, PC B and the cumulative sum for Process B may be reset to the degraded value, and the Process B sample count may be reset to one. Thus the calibration period comprises a series of sub-periods, each sub-period lasting x days. The value of x may take any value, for instance 14, 21 or 28 days, or any other number of days. Each sub-period may have the same duration, or the durations may vary.

The value of x may be based on a length of time which is greater than the maximum expected duration of an icing event for the location of the wind turbine. So for example if it is expected that no icing event will last longer than 10 days, then x may be set to 14.

At the end of the first-sub period, if the temperature has been above the freezing threshold throughout the first sub-period, then PC A and PC B will be the same. PC B is then reset, so at the end of the second-sub period PC A and PC B will most likely be different.

At the end of each sub-period, the output of Process B (PC B) is a sub-period value which has been generated on the basis of the performance data generated during that sub-period. In other words, at the end of each period, the sub-period value (PC B) will be indicative of an average of the power data generated during that sub-period.

At the end of each sub-period, the sub-period value (PC B) is compared with the reference (PC A) at step 51, and the reference (PC A) is updated with the sub-period value (PC B) at step 52 if the comparison shows that a performance of the wind turbine indicated by the sub-period value (PC B) is better than a performance of the wind turbine indicated by the reference (PC B). So if PC B>PC A, then PC A is updated with PC B.

As mentioned above, throughout the calibration period the reference for each bin used in step 43 of FIG. 3 is set to be the same as the current value of PC A. So when Process A is running, the reference may change every 0.1 s, based on the output of Process A. Alternatively, the reference may change less frequently, for instance taking the value of PC A at the end of each sub-period. When PC A is updated with PC B at step 52, the next iteration of step 43 of FIG. 3 will use the updated version of PC A (i.e. PC B).

Optionally Process A may also be reset at step 52 of FIG. 5. So at step 52, the cumulative sum and the Process A sample count may be reset to zero. Alternatively, at step 52, the cumulative sum for Process A may be set to PC B, and the Process A sample count may be reset to one.

In an alternative embodiment, instead of maintaining a running average, Process B may simply calculate a single average at the end of each sub-period, for the purpose of the comparison at step 51.

If the ambient temperature moves above and below the freezing threshold during the calibration period, then at least one of the sub-period values (PC B) will be determined on the basis of performance data associated with temperature readings below the freezing threshold. The running average of Process A, on the other hand, is only based on performance data associated with temperature readings above the freezing threshold.

Consider now a calibration period in which the temperature is above the freezing threshold at all times. In this case, Process A will be running at all times. If the performance of the wind turbine is continuously improving over the calibration period, then PC A will regularly be updated with PC B because the short-term average represented by PC B will tend to be higher than the long-term average represented by PC A. So in this case, the reference will keep track with the improving performance, which will make the ice detection process of FIG. 3 more reliable.

If the performance of the wind turbine is continuously reducing over the calibration period, then PC A will tend to be higher than PC B so it will not be updated. So in this case, the reference for step 43 of FIG. 3 is set on the basis of PC A, which will be a running average of the performance data for a plurality of the sub-periods.

If the performance of the wind turbine varies randomly over the calibration period, then the behaviour will be more complex, with PC A only being updated by PC B if PC B is unusually high.

Consider now a calibration period in which the temperature is below the freezing threshold at all times. Thus there is a risk that the turbine blades may be iced up. Process A will not be running, so at the end of the first sub-period, PC A will be updated with PC B, if PC B is above the degraded value. If the blades are severely iced, then PC B may not be greater than PC B at the end of the first sub-period. However, more likely PC B will be above the degraded value, so PC A will be updated with PC B. At the end of each subsequent sub-period, PC A may or may not be updated with PC B, depending on whether the performance of the wind turbine has been improving. If the blades become iced-up during a particular sub-period, then the performance of the turbine will degrade, so PC B will not be higher than PC A during that sub-period. Thus it can be seen that the process provides a reliable way of calibrating the reference, even during winter, because there is a high degree of confidence that PC B is not degraded due to icing, if it is greater than PC A.

Consider now a calibration period in which the temperature is above the freezing threshold for a first set of sub-periods (for instance five sub-periods), then below the freezing threshold for a second set of sub-periods. From the beginning of the sixth sub-period, PC A will be fixed, but it will only be updated at the end of the sixth sub-period (and any later sub-period) if PC B>PC A. Thus if the blades become iced-up during the second set of sub-periods, then the performance of the turbine will degrade so PC B will not be higher than PC A during the icing event. So the process provides a reliable way of calibrating the reference during the second set of sub-periods, despite the icing risk.

Consider now a calibration period in which the temperature is below the freezing threshold for a first set of sub-periods (for instance five sub-periods) then above the freezing threshold for a second set of sub-periods. The process provides a reliable way of calibrating the reference during the first set of sub-periods, despite the icing risk. Process A starts running at the end of the fifth sub-period. From the seventh sub-period onwards, PC A will start to diverge from PC B.

The calibration period may be terminated at step 53 of FIG. 5 when the Process A sample count reaches a calibration threshold. This calibration threshold may be set to any value, for example based on three, four of five months' worth of data. Note that the Process A sample count is reset every time PC B>PC A at the end of a sub-period.

The method described above enables each reference contained in the reference data 34 to be calibrated during a calibration period. It is not necessary to wait until the end of the calibration period to start running the ice detection and control process of FIG. 3—rather the process of FIG. 3 can run during the calibration period.

After the calibration period is terminated in step 53, then the reference data 34 may be fixed for the rest of the operating life of the wind turbine. Alternatively the calibration process of FIG. 5 may be repeated again at a later date. Alternatively, Process A may keep running after the calibration period is terminated. In this case, the reference for each bin used in step 43 of FIG. 3 continues to be set to be the same as the current value of PC A (with Process B no longer running). So the reference may be adjusted for the full life of the wind turbine, based on the output of Process A. This will enable the reference to keep track of any gradual degradation in the performance of the wind turbine towards the end of its operating life.

Figure 6:
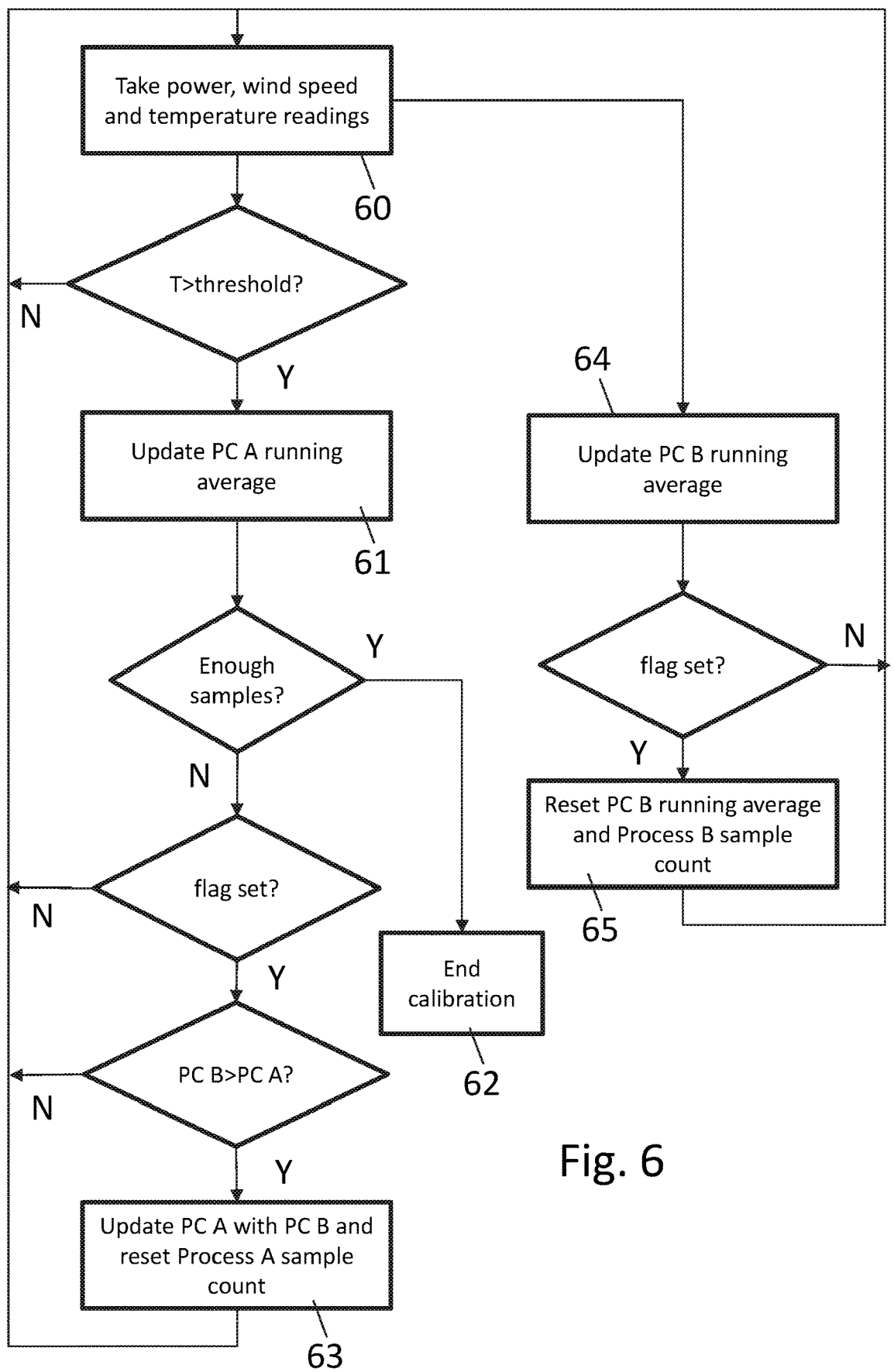
FIG. 6 shows a second method of calibrating a reference.

FIG. 6 is a flow diagram showing an alternative process, which is similar to FIG. and uses the same Process A and Process B, which will not be described again.

At the start of the calibration period, PC A is set to a degraded value. Then at step 60, the calibration system 33 takes power, ambient temperature and wind speed readings from the power sensor 30, temperature sensor 31 and wind speed sensor 32 respectively.

At step 61, if the temperature is above the freezing threshold then the running average of PC A is updated and the Process A sample count is incremented.

If the Process A sample count has exceeded the calibration threshold, then calibration is terminated at step 62.

Every x days, a flag is set. If the flag is set, then PC B is compared with PC A at step 63. If PC B>PC A, then at step 63 PC A is updated with PC B, and the Process A sample count is reset.

At step 64, the PC B running average is updated. If the flag is set, then at step 65 PC B is reset along with the Process B sample count.

In summary, FIGS. 5 and 6 give examples of a method of calibrating a reference of a wind turbine. The method comprises monitoring performance of the wind turbine over a calibration period to generate performance data, wherein the calibration period comprises a series of sub-periods. The reference is calibrated by: setting the reference on the basis of the performance data (that is, by setting the reference to PC A); and, for each sub-period: determining a sub-period value (PC B) on the basis of the performance data generated during that sub-period, comparing the sub-period value (PC B) with the reference (PC A), and updating the reference with the sub-period value if the comparison shows that a performance of the wind turbine indicated by the sub-period value is better than a performance of the wind turbine indicated by the reference (PC B>PC A). The comparison and updating steps enable the reference to more accurately reflect performance of the wind turbine. The method can also be reliably used in freezing temperatures.

In the examples given above, two processes (Process A and Process B) may run in parallel, depending on the temperature. An advantage of the present invention is that in the case of only below freezing ambient temperatures, Process A may not be required.

There may be three different cases:
1. Only above freezing ambient temperatures—the reference is set on the basis of Process A
2. Mix of above and below freezing ambient temperature—the reference is set on the basis of either Process A or B (depending on which one represents a better performance)

3. Only below freezing ambient temperatures—the reference is set on the basis of Process B In case 1 the ambient temperature is above 0° C. for all of the calibration period; and in case 2 and 3 the wind turbine is subject to an ambient temperature below 0° C. for some or all of the calibration period.

In case 1, the reference is set on the basis of performance data associated with temperature readings above a freezing threshold.

In case 2, the reference is set on the basis of performance data associated with temperature readings above a freezing threshold, and at least one of the sub-period values is determined on the basis of performance data associated with temperature readings below the freezing threshold.

In case 3, the reference is set on the basis of performance data associated with temperature readings below a freezing threshold, and all of the sub-period values are determined on the basis of performance data associated with temperature readings below the freezing threshold.

Consider the following example of case 3, in which a wind turbine is commissioned and is always in below freezing ambient temperatures. The wind turbine starts with a degraded reference, then Process B runs for x days. After those x days it will most likely output a better performance than the reference (because it started with a quite poor reference), so now the reference is what Process B computed. Process B is then reset and it starts its new sub period. In the new sub period the turbine experiences some icing so during the next x days the performance will not be better, so the reference is kept and Process B is reset again. In the next x days the wind turbine is completely ice free, so when it comes to update the reference Process B will reflect a fairly accurate performance which will be better than what is being used as reference. So the reference is updated. Thus Process B will converge to the correct reference even if the wind turbine experiences occasional ice periods.

In the above examples, an icing state of the wind turbine is determined. In other embodiments of the present invention other degradation states of the wind turbine may be detected (such as fouling of the blades with dirt or other debris).

In the above examples, Process A only uses performance data associated with temperature readings above a freezing threshold. In other examples, both Process A and Process B may run at all temperatures.

In the above examples, the calibration process of FIGS. 5 and 6 is terminated. In other examples, the calibration process may not be terminated, so it may run for the full operating life of the wind turbine.

In the above examples, the performance data is divided between a plurality of bins, each bin associated with a respective range of wind speeds. In other examples, the bins may be based on other operating conditions of the wind turbine.

In the above examples, Process A and Process B maintain running averages of the performance data. In other examples, Process A and/or Process B may generate other statistical measures of the performance data for their respective time intervals.

In the above examples, the performance data is indicative of a power generated by the wind turbine, such as grid power delivered to the grid. In other examples, other performance data may be used. For instance the control system 10 may calculate an estimated wind speed based on various turbine parameters such as pitch angle, rotor speed, grid power, and power coefficient (Cp). If the estimated wind speed is less than a measured wind speed from the wind speed sensor 32, then this is indicative of a degraded performance. So in this case, step 43 of FIG. 3 may compare the estimated wind speed with the measured wind speed.

Although the invention has been described above with reference to one or more preferred embodiments, it will be appreciated that various changes or modifications may be made without departing from the scope of the invention as defined in the appended claims.

The invention claimed is:

1. A method of calibrating a reference of a wind turbine, the method comprising:
   monitoring performance of the wind turbine over a calibration period to generate performance data, wherein the calibration period comprises a series of sub-periods; and
   for each sub-period:
      determining a sub-period value on the basis of the performance data generated during that sub-period;
      determining an operational condition of the wind turbine; and
      determining whether the operational condition is a pre-defined operational condition,
   for an operational condition being a pre-defined operational condition:
      updating the reference with the sub-period value thereby calibrating the reference, and
   for all operational conditions:
      comparing the sub-period value with the reference; and
      updating the reference with the sub-period value when the comparison shows that a performance of the wind turbine indicated by the sub-period value is better than a performance of the wind turbine indicated by the reference thereby calibrating the reference, and
   wherein the reference is set on the basis of a running average of the performance data, the running average being determined on the basis of a sample count, and wherein the method further comprises resetting the sample count when the comparison shows that the performance of the wind turbine indicated by the sub-period value is larger than the performance of the wind turbine indicated by the reference.

2. The method according to claim 1, wherein the pre-defined operational condition is a condition associated with temperature readings above a freezing threshold, and at least one of the sub-period values is determined on the basis of performance data associated with temperature readings below the freezing threshold.

3. The method according to claim 2, further comprising terminating the calibration period when an amount of the performance data associated with temperature readings above the freezing threshold reaches a calibration threshold.

4. The method according to claim 1, wherein the performance data is divided between a plurality of bins; each bin is associated with a respective selected operating condition of the wind turbine; and the method is performed per bin to calibrate a reference per bin.

5. The method according to claim 4, wherein each bin is associated with a respective range of wind speeds.

6. The method according to claim 1, wherein the sub-period value is a sub-period average indicative of an average of the performance data generated during that sub-period.

7. The method according to claim 1, wherein the performance data is indicative of a power generated by the wind turbine.

8. The method according to claim 1, further comprising, at the start of the calibration period, setting the reference to a degraded value.

9. A computer program product comprising software code adapted to calibrate a reference of a wind turbine when executed on a data processing system, the computer program product being adapted to perform an operation for calibrating the reference of the wind turbine, comprising:
monitoring performance of the wind turbine over a calibration period to generate performance data, wherein the calibration period comprises a series of sub-periods; and
for each sub-period:
determining a sub-period value on the basis of the performance data generated during that sub-period;
determining an operational condition of the wind turbine; and
determining when the operational condition is a pre-defined operational condition,
for an operational condition being a pre-defined operational condition:
updating the reference with the sub-period value thereby calibrating the reference;
for all operational conditions:
comparing the sub-period value with the reference; and
updating the reference with the sub-period value when the comparison shows that a performance of the wind turbine indicated by the sub-period value is better than a performance of the wind turbine indicated by the reference thereby calibrating the reference, and
wherein the reference is set on the basis of a running average of the performance data, the running average being determined on the basis of a sample count, and wherein the method further comprises resetting the sample count when the comparison shows that the performance of the wind turbine indicated by the sub-period value is larger than the performance of the wind turbine indicated by the reference.

10. A method of detecting a state of a wind turbine, the method comprising: calibrating a reference of the wind turbine by:
monitoring performance of the wind turbine over a calibration period to generate performance data, wherein the calibration period comprises a series of sub-periods; and
for each sub-period:
determining a sub-period value on the basis of the performance data generated during that sub-period;
determining an operational condition of the wind turbine, and
determining when the operational condition is a pre-defined operational condition,
for an operational condition being a pre-defined operational condition:
updating the reference with the sub-period value thereby calibrating the reference;
for all operational conditions:
comparing the sub-period value with the reference, and
updating the reference with the sub-period value when the comparison shows that a performance of the wind turbine indicated by the sub-period value is better than a performance of the wind turbine indicated by the reference thereby calibrating the reference; and
during the calibration period, detecting a state of the wind turbine by comparing the performance data with the reference, and
wherein, at the start of the calibration period, the method comprises setting the reference to a degraded value according to a degraded power curve that is lower than a reference power curve.

11. The method according to claim 10, wherein the state is an icing state.

12. The method according to claim 11, further comprising:
operating the wind turbine on the basis of the detected state, and wherein the wind turbine is operated on the basis of the detected state by changing an operating parameter of the wind turbine.

13. The method according to claim 11, further comprising:
operating the wind turbine on the basis of the detected state, and wherein the wind turbine is operated on the basis of the detected state by actuating an ice removal system of the wind turbine.

14. An apparatus, comprising:
a performance sensor configured to monitor a performance of a wind turbine to generate performance data; and
a calibration system configured to calibrate a reference by performing an operation, comprising:
monitoring performance of the wind turbine over a calibration period to generate performance data, wherein the calibration period comprises a series of sub-periods; and
for each sub-period:
determining a sub-period value on the basis of the performance data generated during that sub-period;
determining an operational condition of the wind turbine, and
determining when the operational condition is a pre-defined operational condition, for an operational condition being a pre-defined operational condition:
updating the reference with the sub-period value thereby calibrating the reference;
for all operational conditions:
comparing the sub-period value with the reference, and
updating the reference with the sub-period value when the comparison shows that a performance of the wind turbine indicated by the sub-period value is better than a performance of the wind turbine indicated by the reference thereby calibrating the reference, and
wherein the reference is set on the basis of a running average of the performance data, the running average being determined on the basis of a sample count, and wherein the operation further comprises resetting the sample count when the comparison shows that the performance of the wind turbine indicated by the sub-period value is larger than the performance of the wind turbine indicated by the reference.

* * * * *